Figure 1:
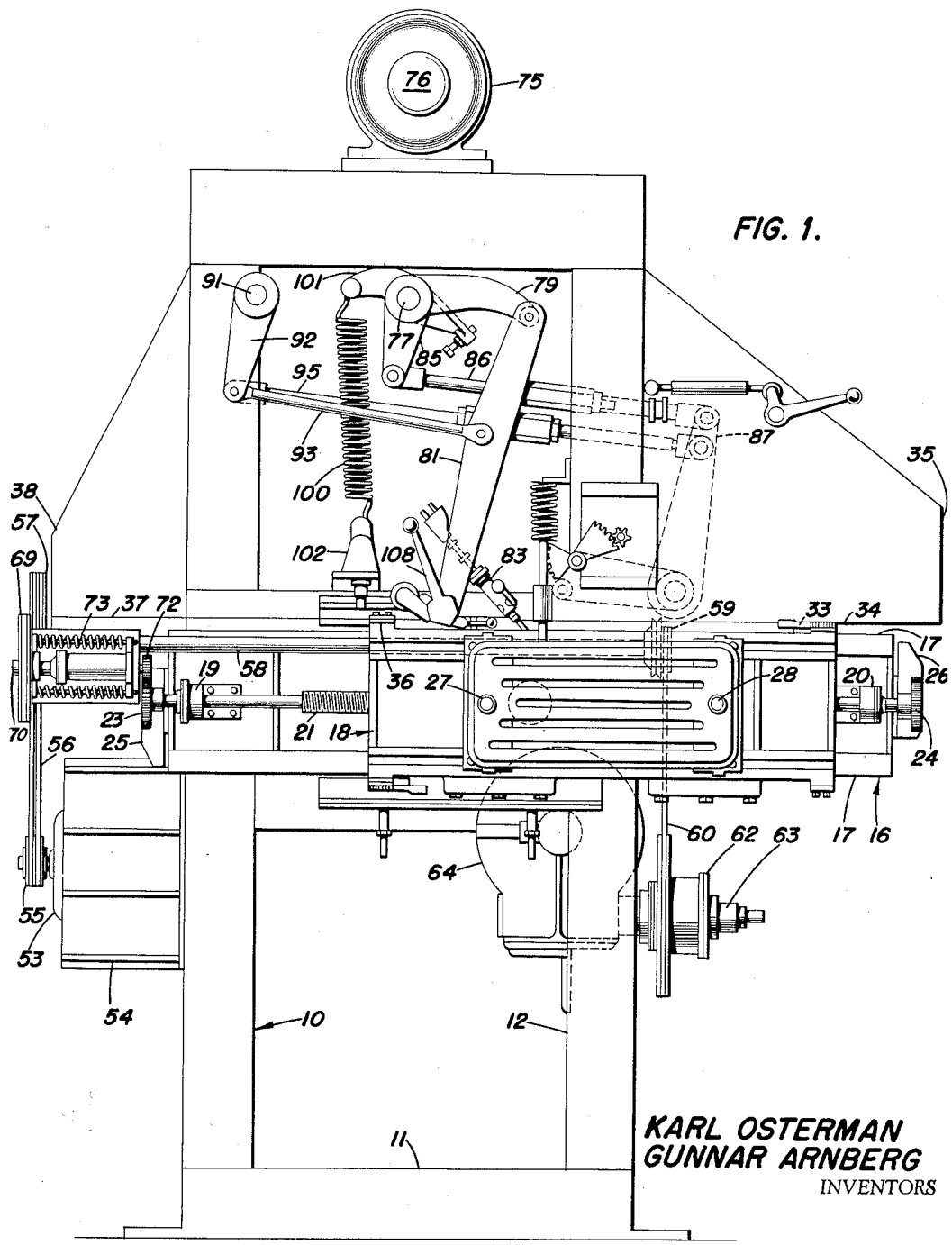

Sept. 13, 1955   K. ÖSTERMAN ET AL   2,717,569
APPARATUS FOR WELDING RADIATORS
Filed July 9, 1947   5 Sheets-Sheet 1

KARL OSTERMAN
GUNNAR ARNBERG
INVENTORS

BY *Jarvis C. Markle*
   *their* ATTORNEY

KARL OSTERMAN
GUNNAR ARNBERG
INVENTORS

INVENTORS
**KARL OSTERMAN
GUNNAR ARNBERG**

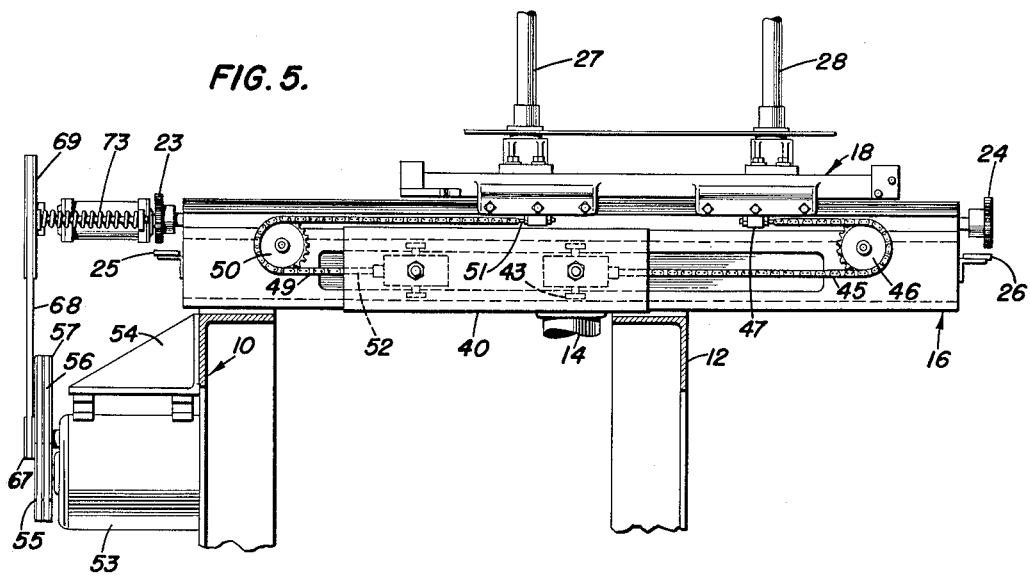
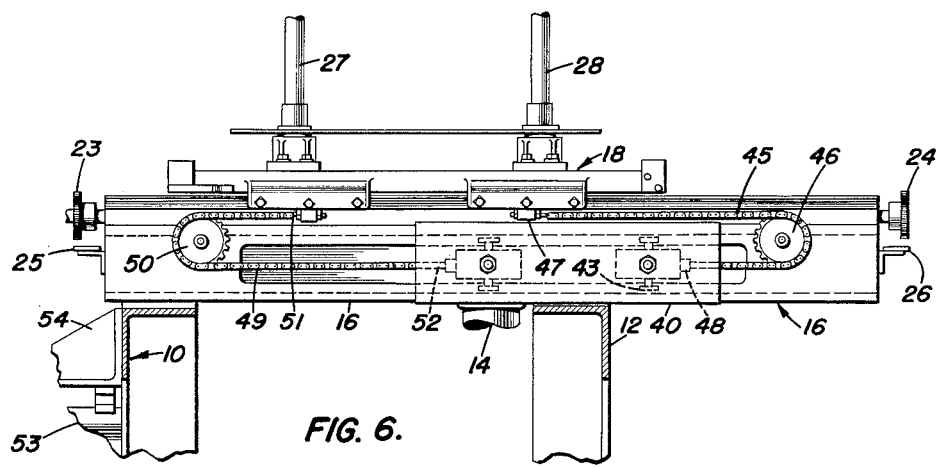

United States Patent Office 2,717,569
Patented Sept. 13, 1955

2,717,569

APPARATUS FOR WELDING RADIATORS

Karl Österman, Stockholm, and Gunnar Arnberg, Lidingo, Sweden, assignors to Svenska Aktiebolaget Gasaccumulator, Lidingo, Sweden, a corporation of Sweden Original application July 9, 1947, Serial No. 759,842, now Patent No. 2,667,137, dated January 26, 1954. Divided and this application November 25, 1953, Serial No. 394,444

Claims priority, application Sweden July 15, 1946

15 Claims. (Cl. 113—59)

This invention relates to manufacturing and more particularly to an apparatus for automatically forming a welded joint which joint has relatively long straight portions and curved portions lying in substantially the same plane.

This application is a division of our co-pending application S. N. 759,842 filed July 9, 1947, now U. S. Patent No. 2,667,137, granted January 26, 1954.

In the manfacture of radiators for use in steam, hot water or similar heating systems, which radiators are composed of a plurality of sections assembled together and in which each section comprises two half shells formed by a stamping operation and welded together, it has been found that a serious problem arises in obtaining a uniform welded joint around the entire periphery of the shells. This is due to the fact that portions of the joint are straight and other portions are curved even though these straight and curved portions lie in substantially the same plane. Attempts have been made to overcome this difficulty by varying the feeding velocity of the work piece with relation to the welding burner, but due to the relatively large masses involved, rapid changes in velocity are exceedingly difficult to obtain and consequently this method has proved impractical.

Briefly stated the present invention contemplates the provision of an apparatus in which a plurality of shells for forming a plurality of radiator sections are mounted on a carrier there being also provided a welding burner nozzle for each joint to be welded. The carrier is mounted for both rectilinear and rotary movement with relation to the welding burner and the burners are mounted in such a manner that the distance between the same and the joint may be varied in accordance with the portion of the joint receiving heat from the burner in order to obtain a uniform weld.

The invention contemplates the welding of generally rectangular radiator sections having relatively long straight sides, relatively short straight ends and curved portions connecting the sides and ends. In operation the carrier moves in a straight line during welding of the long straight side, rotates through an arc of 180 degrees during welding of the curved portions and one end portion and moves in a straight line in the opposite direction during welding of the other long side, rotating once more through 180 degrees during welding of the other curved portions and end portion to complete the welded joint. During rotation of the carrier the distance between the welding burner and the joint is automatically varied in order to obtain a uniform weld and once operation of the apparatus is initiated the same is completely automatic until completion of the joint.

It is accordingly an object of the invention to provide a welding apparatus which automatically forms a uniform welded joint having relatively long straight side portions and relatively short straight end portions connected by curved portions.

A further object of the invention is the provision of a welding apparatus having carrier means for receiving and supporting a plurality of shells to form radiator sections which carrier automatically moves in a predetermined path with relation to welding burners in order to provide a uniform welded joint.

Another object of the invention is the provision of an apparatus for automatically welding together half shells to form radiator sections, such shells being mounted on a carrier designed to move in one direction in a straight line to weld one side joint, rotate through 180 degrees to weld one end joint, move in a straight line in the opposite direction, to weld the opposite side joint and rotate through 180 degrees to weld the other end joint.

A still further object of the invention is the provision of a welding apparatus for welding together half shells to form radiator sections, which shells are mounted on a carrier and in which means is provided to automatically counter-balance the weight of the shells as the carrier moves during the welding operation.

A further object of the invention is the provision of an automatic welding apparatus for welding together half shells to form radiator sections and in which means is provided for moving the shells in a straight line past welding burners to form a relative long straight welded joint and for automatically rotating the shells to form a relatively short, straight welded joint and curved joints connecting the long and short straight joints.

Another object of the invention is the provision of an automatic welding apparatus for welding together half shells to form radiator sections and in which such shells travel in a straight line during part of the welding operation and through a curved path during another part of the welding operation there being driving means provided for moving the shells in a straight line in one direction, which driving means automatically disengages during rotary motion of the shells and upon completion of such rotary motion automatically re-engages to move the shells in the opposite direction.

Another object of the invention is the provision of an automatic welding apparatus for welding together half shells to form radiator sections which apparatus may be operated by relatively unskilled labor, by simply mounting half shells on a carrier, initiating operation of the apparatus and removing the completed radiator sections upon the automatic stopping of the apparatus after completion of the welded joint.

Figure 2:
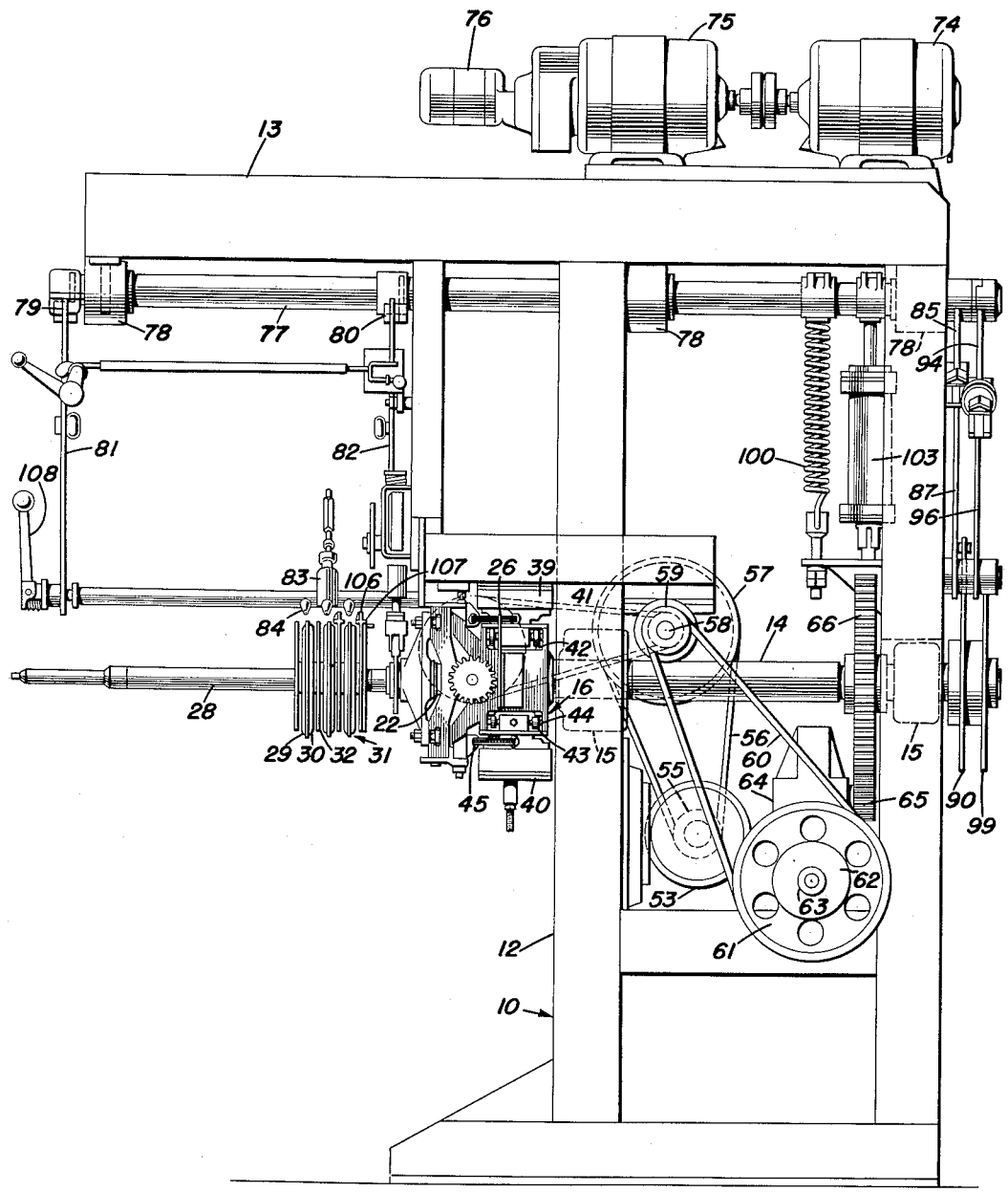
Figure 3:
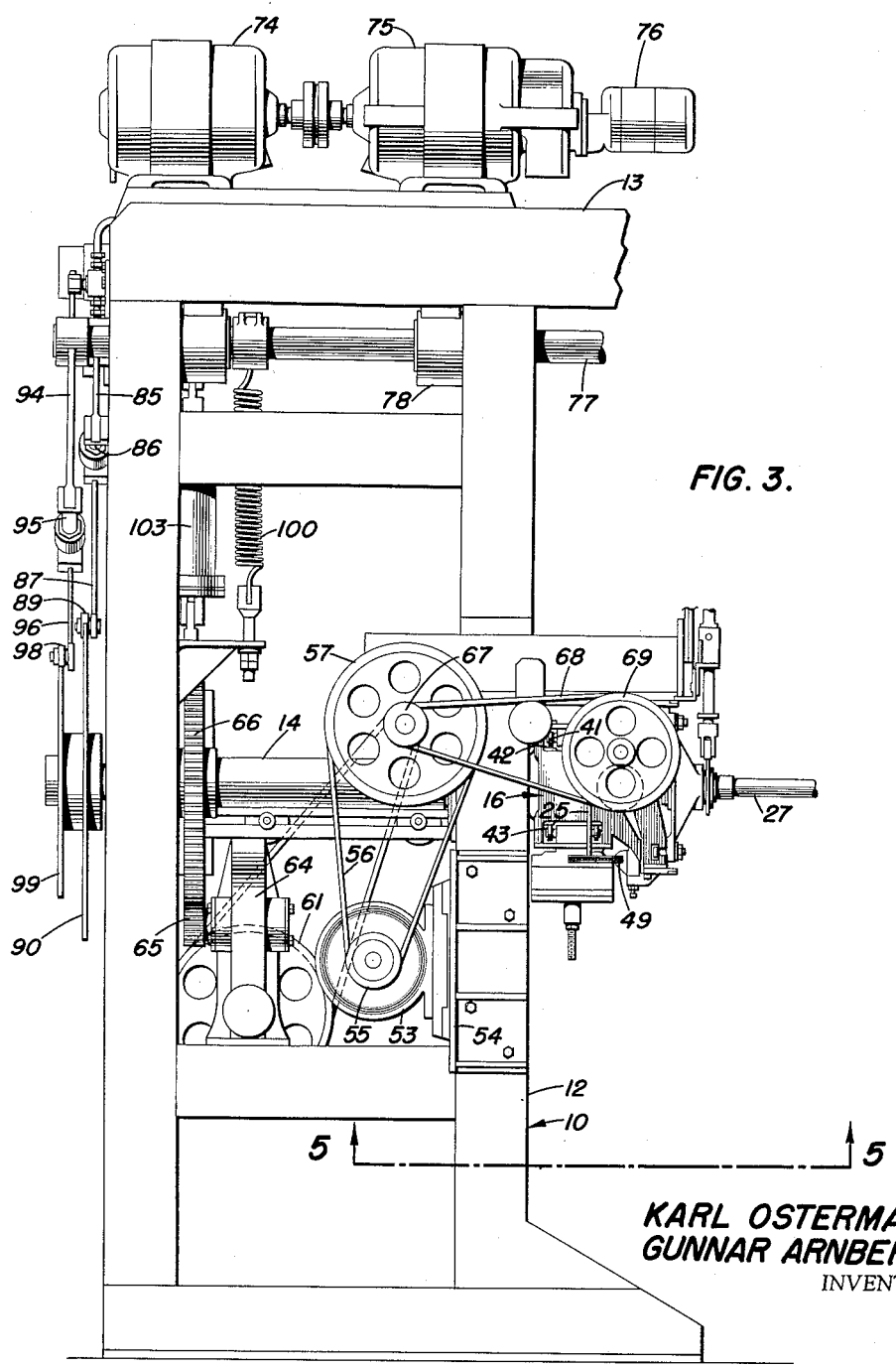
Figure 4:
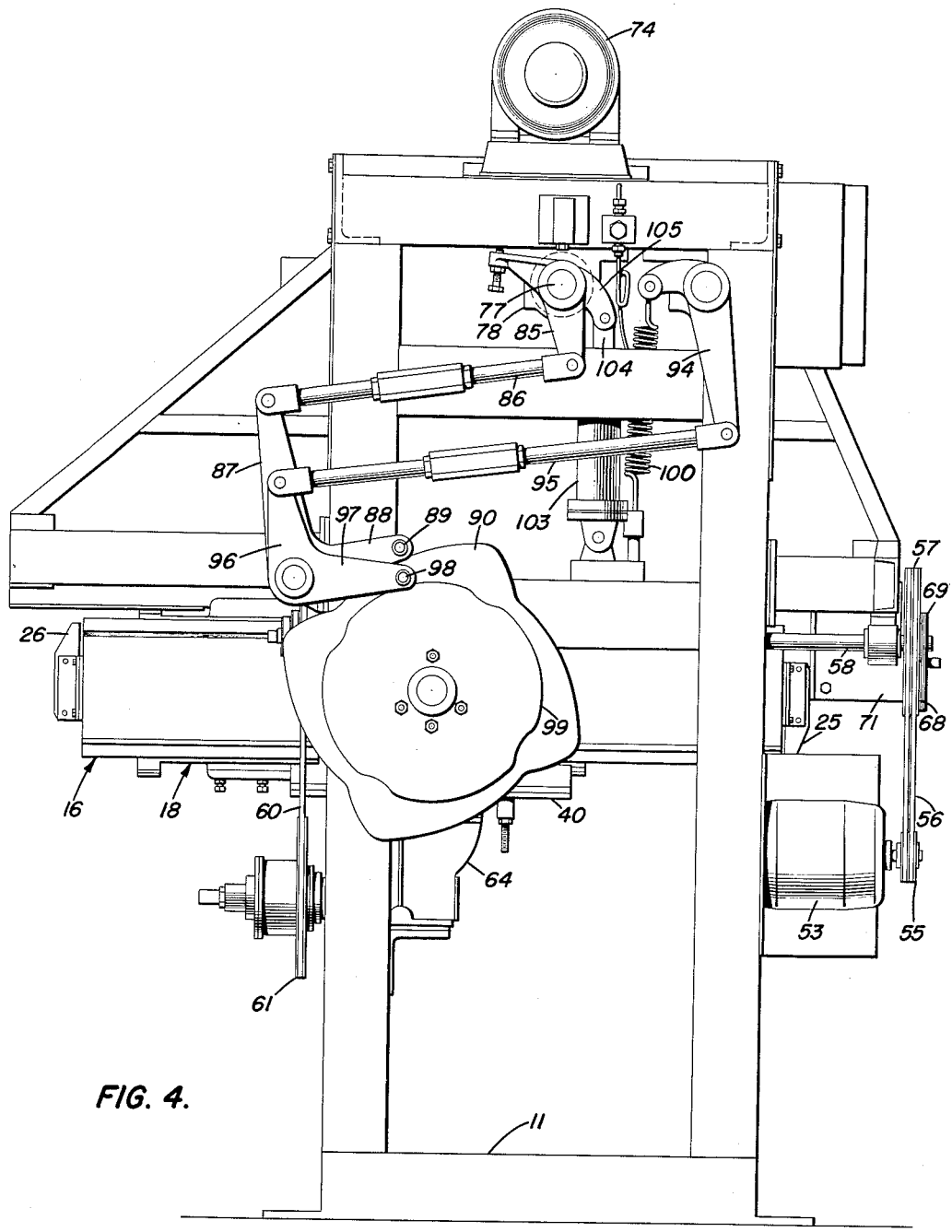

Further objects and advantages of the invention will be apparent from the following description taken in conjunction with the accompanying drawings wherein:

Figure 1 is a front elevational view of an automatic welding apparatus constructed in accordance with this invention;

Fig. 2, a side elevational view of the apparatus shown in Fig. 1;

Fig. 3, a side elevational view opposite to that shown in Fig. 2;

Fig. 4, a rear elevational view;

Fig. 5, a fragmentary sectional view on the line 5—5 of Fig. 3 and showing the carrier and counter-balancing means in one position during the travel thereof; and Fig. 6, a view similar to Fig. 5 and showing the carrier and counter-balancing means in another position during the travel thereof.

With continued reference to the drawing there is shown a welding apparatus constructed in accordance with this invention and comprising a frame 10 composed of a base 11, upstanding side members 12 and top members 13 which extend forwardly of the side members 12. Substantially midway of the height of the apparatus a main supporting shaft 14 is journaled for rotation in bearings 15 carried by the side members 12 of the frame 10, shaft 14 serving to support at the forward end thereof a carriage 16.

Carriage 16 is of elongated rectangular configuration and is symmetrically arranged with respect to the shaft 14 and is provided with opposed slideways 17 for slidably receiving a carrier 18. Journaled for rotation in bearings 19 and 20 mounted adjacent opposite ends of carriage 16 is a lead-screw 21 which is in continuous meshing engagement with a nut 22 mounted on the carrier 18 and extending rearwardly thereof. The lead-screw 21 is provided adjacent each end thereof with spur gears 23 and 24 and the carriage 16 is provided at each end thereof with cams 25 and 26, the purpose of which will be later described.

The carrier 18 is provided with forwardly extending rods 27 and 28 which serve to receive and support half shells 29 and 30 forming when welded together radiator sections 31. Each pair of shells 29 and 30 when installed on the rods 27 and 28 are separated from the next pair of shells by a cam plate 32 the purpose of which will be later described. The shells 29 and 30 and the cam plates 32 may be secured on the rods 27 and 28 by any suitable mechanism. A shoe 33 is mounted on one end of the carrier 18 in sliding engagement with the lower surface 34 of a slide 35 secured to the side members 12 on one side of the machine and the opposite end of carrier 18 is provided with a shoe 36 in sliding engagement with a surface 37 of a slide 38 mounted on the side members 12 at the opposite side of the machine. The purpose and operation of these shoes 33 and 36 will be presently described.

Since the carriage 16 and carrier 18 are supported entirely from the shaft 14 and since the carrier 18, shells 29 and 30 and cam plates 32 carried thereby move from one end of the carriage 16 toward the other, it is desirable to provide some means for counter-balancing the weight of the carrier 18 and elements carried thereby in order to maintain a substantial balance about the axis of shaft 14. Counter-balancing means is therefore provided in the form of upper and lower weights 39 and 40, weight 39 being carried by rollers 41 disposed in a trackway 42 in the upper surface of carriage 16 and weight 40 being supported by rollers 43 disposed in a trackway 44 in the lower surface of the carriage 16.

Since the weights 39 and 40 must move in a direction opposite to the movements of carrier 18 a convenient mechanism for accomplishing this movement is shown in Figs. 2, 5 and 6. As will be seen from these figures, a chain 45 is trained over a sprocket 46 rotatably mounted adjacent one end of carriage 16, one end of the chain 45 being secured at 47 to the carrier 18 and the opposite end of the chain 45 being secured at 48 to the weight 40. A second chain 49 is trained over a sprocket 50 rotatably mounted adjacent the opposite end of carriage 16, one end 51 of the chain 49 being attached to the carrier 18 and the opposite end 52 of the chain 49 being attached to the weight 40. This chain mechanism is duplicated for the upper weight 39 and obviously as the carrier 18 moves in either direction on the carriage 16 by reason of the rotation of lead-screw 21 in engagement with nut 22 the weights 39 and 40 will move in the opposite direction thereby maintaining a substantial balance about the axis of shaft 14.

A driving motor 53 is mounted on a bracket 54 on one of the upstanding side members 12 of frame 10 and motor 53 is provided with a pulley 55 engaging belts 56 which in turn engage a pulley 57 mounted on a shaft 58 extending transversely of the apparatus. Mounted on the opposite end of shaft 58 is a pulley 59 engaging a belt 60 which in turn is trained over a pulley 61 driving a slip-coupling 62. Slip-coupling 62 is mounted on a shaft 63 which drives a speed reducing gear transmission 64 of the worm-type and the output shaft of transmission 64 is provided with a pinion gear 65 meshing with a gear 66 mounted on the shaft 14.

A pulley 67 is mounted on the opposite end of shaft 58 from pulley 59 and pulley 67 engages a belt 68 which in turn engages a pulley 69 mounted on a shaft 70 journaled for rotation on a bracket 71 extending from a side member 12 of the frame 10, shaft 70 carrying adjacent the opposite end thereof a pinion gear 72 which serves to mesh with either gear 23 or gear 24 on the lead-screw 21 in order to drive the same for moving the carrier 18 in either direction on the carriage 16. The gear 72 is slidably but non-rotatably mounted on the shaft 70 and gear 72 is normally maintained in a position to mesh with gear 23 or gear 24 by compression springs 73. Gear 72 may be moved toward the left as viewed in Fig. 1 against the action of springs 73 in a manner and for a purpose to be presently described.

Motor 53 may be energized by current from a conventional electric supply line or in the event a different voltage is required, this motor may be energized from a generator 74 driven by a motor 75 from the available supply line there being also provided an exciter 76 for energizing the field of the generator 74. This motor generator set may be conveniently mounted on the top members 13 of the frame 10.

While the welding burners and mounting mechanism therefor comprise no part of this invention, such mechanism being described and claimed in the application of which this is a division, nevertheless this mechanism will be described in order to provide a complete understanding of the structure and operation of the welding apparatus of this invention.

A shaft 77 is journaled for rotation in bearings 78 carried by the top members 13 of the frame 10 and this shaft 77 carries lever arms 79 and 80 which serve to support front and rear downwardly extending burner supporting members 81 and 82. Carried by members 81 and 82 adjacent the lower end thereof is one or more burners 83 having a nozzle 84 for each pair of shells 29 and 30. Only one burner 83 is shown in the drawing but obviously as many burners as necessary may be provided in order to weld the joint between as many shells 29 and 30 as the apparatus is designed to accommodate.

The shaft 77 adjacent the rear end thereof is provided with an arm 85 connected by an adjustable link 86 with one arm of a bellcrank lever 87, the opposite arm 88 of which is provided with a roller 89 adapted to engage a cam 90 carried by the shaft 14.

A shaft 91 is rotatably mounted on the frame 10 and this shaft is provided with arms 92 connected by links 93 with the members 81 and shaft 91 is further provided with an arm 94 connected by an adjustable link 95 with one arm of a bellcrank lever 96, the other arm 97 of which is provided with a roller 98 adapted to engage a cam 99 mounted on the shaft 14. The weight of the burners 83 and members 81 and 82 is substantially counter-balanced by a tension spring 100 connected at one end to an arm 101 secured to the shaft 77 and at the opposite end to a bracket 102 secured to the frame 10. Burners 83 and nozzles 84 carried thereby may be conveniently moved into and out of operative position by a fluid pressure cylinder 103 having a piston 104 connected to an arm 105 secured to the shaft 77.

In order to guide the nozzles 84 carried by burner 83 with relation to the joint to be formed between the shells 29 and 30, fingers 106 extend from the burner 83 and are provided with portions 107 for engaging the cam plates 32 and for engaging one side of the shells 29 or 30. These portions 107 are moved into engagement with the sides of the shells after lowering of the nozzles by actuation of a hand lever 108 by the machine operator.

Assuming that the desired number of half shells 29 and 30 and cam plates 32 have been secured on the rods 27 and 28 of the carrier 18 and that the motor 53 is operating, the burners 83 will be ignited and the fluid pressure cylinder 103 will be actuated to lower the members 81 and nozzles 84 into suitable position for the flames to impinge on the joint between the shells 29 and 30 to commence the welding operation. At the same time lead-screw 21 will be driven by pinion gear 72 in engagement with gear 23 to move the carrier 18 and shells 29 and 30 carried thereby to the left as viewed in Fig. 1 thus welding one long side of the shells 29 and 30.

Upon the carrier 18 reaching the end of its travel toward the left as viewed in Fig. 1 the shoes 33 and 36 will have reached the ends of surfaces 34 and 37 on slides 35 and 38 and at this time due to the fact that a continuous torque is exerted on the shaft 14 through the slip-coupling 62, the carriage 16 will rotate in a counter-clockwise direction as viewed in Fig. 1 and the curved portion of the joint between the shells 29 and 30 as well as the short straight end portion will be welded. At this time the rollers 89 and 98 on the bellcrank levers 87 and 96 respectively, will be in engagement with the cams 90 and 99 and since these cams rotate with the shaft 14, the nozzles 84 of the burners 83 will be moved upwardly by operation of the bellcrank lever 87 and transversely by operation of the bellcrank lever 96. This movement of the nozzles 84 maintains a proper distance between the same and the joint between the shells 29 and 30 during rotary movement of the carrier 18 and thereby provides a uniform weld without any change in the velocity of feeding movement.

Obviously immediately upon initiation of rotary movement of the carriage 16 and carrier 18, the gear 23 will move out of mesh with the pinion gear 72 and rotation of the lead-screw 21 will cease. Rotary movement of the carriage 16 and carrier 18 will continue until cam 26 engages a cam follower, not shown, to move the pinion gear 72 out of the path of movement of gear 24 until such time as the carriage 16 reaches a horizontal position whereupon the springs 73 will urge the pinion gear 72 toward the right as viewed in Fig. 1 and into meshing engagement with the gear 24. Since the pinion gear 72 is rotating this engagement with the gear 24 will cause rotation of the lead-screw 21 resulting in movement of the carrier 18 and shells 29 and 30 carried thereby toward the right as viewed in Fig. 1 to complete the long straight weld on the opposite side of the shells 29 and 30. Upon completion of this portion of the welded joint, the carriage 16 and carrier 18 will again rotate through an arc of 180 degrees to complete the curved portion of the joint and the opposite straight end portion.

Suitable control mechanism may be provided to stop operation of the apparatus upon completion of the joint and to actuate the fluid pressure cylinder 103 to raise the burners 83 and to shut off the supply of gas thereto. Also if desired, the motor 53 may be automatically deenergized to completely halt operation of the apparatus but it is contemplated that the motor 53 will operate continuously while completed radiator sections 31 are removed from the apparatus and additional shells 29 and 30 placed thereon for the next welding operation.

The above described invention provides an apparatus which will receive and automatically weld joints of irregular configuration in elements having relatively large mass and in which sudden changes in velocity are avoided and in which movement of the relatively large mass is counter-balanced in order to maintain the moving elements in substantial balance and prevent shock and vibration due to movement of the mass and changes in direction of such movement. It will furthermore be obvious that the apparatus is substantially automatic in operation requiring only the loading and unloading of the parts to be welded and furthermore the operation is such that a uniform welded joint is obtained.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. Apparatus for welding together the edges of juxtaposed work-pieces providing a joint to be welded which includes at least a straight and a curved line in the plane of the weld, said apparatus comprising a frame, an elongated carriage, means for pivotally supporting said carriage on said frame to turn about a pivot point intermediate its ends, a carrier for the work-pieces reciprocably mounted on said carriage for longitudinal movement thereon, a welding burner, means mounting said burner on said frame in spaced relation to said carrier, a nut on said carrier, a threaded spindle rotatably mounted and axially fixed on said carriage and threadedly engaging said nut for moving said carrier along said carriage, a gear on said spindle at each end thereof, actuating means for turning said carriage about said pivot point, means for causing said actuating means intermittently to turn said carriage through a half revolution, driving means including a pinion rotatably mounted on said frame and arranged to engage one or the other of said gears to turn said spindle during the intervals at the completion of each said half revolution between the intermittent turning of said carriage and means operative when said carriage is turned for effecting engagement of said pinion with the one of said gears.

2. Apparatus as set forth in claim 1 including means for shifting said pinion out of the path of movement followed by said gears when the carriage is turned.

3. Apparatus as set forth in claim 1 in which the driving means includes an axially movable mounting on said frame for movement of said pinion toward and away from said carriage and cam means carried by said carriage for causing said pinion to move out of the path of movement of said gears and into engagement with one of said gears when the carriage is turned through a half revolution.

4. Apparatus as set forth in claim 1 including shoes on opposite sides of said carrier at opposite ends thereof and slide members on the frame of the apparatus engaging said shoes to impose rectilinear motion on said carrier and prevent turning movement of the carrier and carriage, said shoes and slide members being located relative to each other so as to disengage when the carrier is moved to a predetermined position relative to said carriage to permit said turning movement.

5. Apparatus as set forth in claim 4 including a continuously operating source of power and a driving connection between said source and said carriage for turning the latter about its pivot point, said driving connection including a slip-type coupling for enabling the turning movement of the carriage to be stopped intermittently.

6. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, a carrier slidably mounted on said carriage for longitudinal movement, means for securing a plurality of work-pieces on said carrier, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, biasing means for urging said pinion gear in one direction, means for moving said pinion gear in the opposite direction, drive means for continuously driving said pinion gear, a slip-coupling connecting said driving means and said shaft whereby a continuous torque is applied to said shaft, stop means for preventing rotation of said carriage by reason of said torque and welding burners mounted on said frame whereby upon movement of said carrier and work-pieces in one direction one straight portion of said joint will be welded and upon completion of such movement said stop means will be rendered inoperative thereby permitting said carriage to rotate and weld a curved portion of said joint, rotation of said carriage disengaging said gear from said pinion to stop rotation of said lead-screw, continued rotation of said carriage causing said second mentioned means to move said pinion out of the path of movement of the other of said gears until said carriage has rotated 180 degrees at which time said biasing means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

7. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, a carrier slidably mounted on said carriage for longitudinal movement, means for securing a plurality of work-pieces on said carrier, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, biasing means for urging said pinion gear in one direction, a cam on each end of said carriage, drive means for continuously driving said pinion gear, a slip-coupling connecting said driving means and said shaft whereby a continuous torque is applied to said shaft, stop means for preventing rotation of said carriage by reason of said torque and welding burners mounted on said frame whereby upon movement of said carrier and work-pieces in one direction one straight portion of said joint will be welded and upon completion of such movement said stop means will be rendered inoperative thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said biasing means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

8. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, biasing means for urging said pinion gear in one direction, a cam on each end of said carriage, drive means for continuously driving said pinion gear, a slip-coupling connecting said driving means and said shaft whereby a continuous torque is applied to said shaft, stop means for preventing rotation of said carriage by reason of said torque and welding burners mounted on said frame whereby upon movement of said carrier and work-pieces in one direction one straight portion of said joint will be welded and upon completion of such movement said stop means will be rendered inoperative thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said biasing means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

9. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, biasing means for urging said pinion gear in one direction, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque and welding burners mounted on said frame whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said biasing means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

10. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque and welding burners mounted on said frame whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

11. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque and welding burners mounted on said frame whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

12. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque, counter-balancing means for said carrier and work-pieces, said counter-balancing means being movably mounted on said carriage and welding burners mounted on said frame for movement toward and away from said work-pieces whereby upon movement of said carrier and workpieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

13. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque, counter-balancing means for said carrier and workpieces comprising weights slidably mounted on said carriage, means connected between said weights and said carrier to move said weights in one direction as a result of movement of said carrier in the opposite direction and welding burners mounted on said frame for movement toward and away from said work-pieces whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

14. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque, counter-balancing means for said carrier and work-pieces comprising weights slidably mounted on said carriage, guides rotatably mounted on said carriage adjacent each end thereof, flexible means engaging said guides and connected at their ends to said weights and said carrier whereby upon movement of said carrier in one direction said flexible means will cause said weights to move in the opposite direction and welding burners mounted on said frame for movement toward and away from said work-pieces whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

15. Apparatus for welding together the edges of juxtaposed work-pieces providing a joint to be welded which includes straight portions and curved portions in substantially the same plane, said apparatus comprising a frame, a shaft rotatably mounted on said frame, an elongated carriage secured to said shaft for rotation therewith, slideways on said carriage, a carrier slidably mounted on said slideways for longitudinal movement, means for securing a plurality of work-pieces on said carrier, shoes on said carrier in sliding engagement with slides on said frame, a lead-screw rotatably mounted on said carriage, a nut on said carrier in engagement with said lead-screw, a gear on each end of said lead-screw, a pinion gear rotatably and slidably mounted for meshing engagement with one or the other of the gears on said lead-screw, resilient means for opposing sliding movement of said pinion gear, a cam on each end of said carriage, drive means for continuously driving said pinion gear, a slip-coupling connecting said driving means and said shaft whereby a continuous torque is applied to said shaft, the engagement of said shoes with said slides preventing rotation of said carriage by reason of said torque, counter-balancing means for said carrier and work-pieces comprising weights slidably mounted on said carriage, sprockets rotatably mounted on said carriage adjacent each end thereof, chains engaging said sprockets and connected at their ends to said weights and said carrier whereby upon movement of said carrier in one direction said chains will cause said weights to move in the opposite direction and welding burners mounted on said frame for movement toward and away from said work-pieces whereby upon movement of said carrier and work-pieces in one direction one straight portion of said joint will be welded and upon completion of such movement said shoes will disengage said slides thereby permitting said carriage to rotate and weld a curved portion of said joint, rotation of said carriage disengaging said gear from said pinion to stop rotation of said lead-screw, continued rotation of said carriage causing one of said cams to move said pinion out of the path of movement of the other of said gears until said carriage has rotated 180 degrees at which time said resilient means moves said pinion into meshing engagement with the other of said gears to rotate said lead-screw and move said carrier and work-pieces in the opposite direction thus welding another straight portion of said joint upon completion of which said carriage again rotates 180 degrees to complete welding of the other curved portion of the joint and return said carriage and said carrier to original position.

References Cited in the file of this patent

UNITED STATES PATENTS

| | | |
|---|---|---|
| 1,730,064 | Eskilson | Oct. 1, 1929 |
| 2,469,815 | Cutright | May 10, 1949 |